United States Patent
Horiguchi

(10) Patent No.: US 7,801,420 B2
(45) Date of Patent: Sep. 21, 2010

(54) VIDEO IMAGE RECORDING AND REPRODUCING APPARATUS AND VIDEO IMAGE RECORDING AND REPRODUCING METHOD

(75) Inventor: Takeo Horiguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1162 days.

(21) Appl. No.: 11/434,790

(22) Filed: May 17, 2006

(65) Prior Publication Data

US 2006/0263045 A1 Nov. 23, 2006

(30) Foreign Application Priority Data

May 17, 2005 (JP) .............................. 2005-144190

(51) Int. Cl.
*H04N 5/76* (2006.01)
*H04N 5/00* (2006.01)

(52) U.S. Cl. .......................... 386/125; 386/69; 386/70

(58) Field of Classification Search .................... 386/1, 386/45–46, 52, 83, 95–96, 125–126, 69–70
See application file for complete search history.

(56) References Cited

U.S. PATENT DOCUMENTS

| | | | | |
|---|---|---|---|---|
| 7,079,751 B2* | 7/2006 | Suito et al. | ..................... | 386/46 |
| 7,096,486 B1* | 8/2006 | Ukai et al. | ..................... | 725/58 |
| 7,610,358 B2* | 10/2009 | Benschoter et al. | ......... | 709/219 |
| 7,657,909 B1* | 2/2010 | Nagasaka et al. | ............. | 725/53 |

| | | | |
|---|---|---|---|
| 2002/0061136 A1 | 5/2002 | Shibata et al. | |
| 2003/0016945 A1 | 1/2003 | Nakamura | |

FOREIGN PATENT DOCUMENTS

| | | |
|---|---|---|
| JP | 09-093588 | 4/1997 |
| JP | 09-214879 | 8/1997 |
| JP | 11-259061 | 9/1999 |
| JP | 2000-101939 | 4/2000 |
| JP | 2003-101939 | 4/2003 |
| JP | 2003-283993 | 10/2003 |

OTHER PUBLICATIONS

Japanese Office Action dated Jun. 9, 2009 for Appln. No. 2005-144190.

* cited by examiner

*Primary Examiner*—Thai Tran
*Assistant Examiner*—Nigar Chowdhury
(74) *Attorney, Agent, or Firm*—Pillsbury Winthrop Shaw Pittman, LLP

(57) ABSTRACT

An apparatus includes a program guidance information holding section which holds electronic program guidance information, an algorithm holding section which holds separation point forming algorithms corresponding to a plurality of program attributes acquired from the electronic program guidance information, a program attribute determining section which determines one of the program attributes to which a to-be-processed program of the composite signal belongs based on the electronic program guidance information, an algorithm determining section which determines a separation point formation algorithm corresponding to the determined program attribute, and a separation point setting processing section which forms a separation point of the composite signal based on the determined algorithm.

8 Claims, 20 Drawing Sheets

Program identifier, Broadcasting station code, Broadcasting station name
Broadcasting date, Start time, End time, Genre code, Broadcasting mode
Program name, Subtitle, Cast, Corner information, Detail information

FIG. 2

58327698, 1002, First broadcast, 2005080, 2130, 2200, 0002, [C] [S],
First broadcasting special, Secrets of Jomon pottery, Tokyo Taro,
Unearthing the secrets of Jomon pottery, How did people of the Jomon
period live, ...

FIG. 3

| Item name | Length | Sample | Remarks |
|---|---|---|---|
| Program identifier | 8 | 58327698 | |
| Broadcasting station code | 4 | 1002 | |
| Broadcasting station name | 64 | First broadcasting for integrated services | |
| Broadcasting date | 8 | 20050808 | yyyymmdd |
| Start time | 4 | 2130 | hhmm (24-hour expression) |
| End time | 4 | 2200 | hhmm (24-hour expression) |
| Genre code | 4 | 0002 | |
| Broadcasting mode | 16 | [C] [S] | |
| Program name | 512 | First broadcasting special | |
| Subtitle | 512 | Secrets of Jomon pottery | |
| Cast | 1024 | Tokyo Taro | |
| Corner information | 2048 | Unearthing the secrets of excavation of Jomon pottery | Corner name and the like |
| Detail information | 2048 | How did people of the Jomon period live, ... | |

FIG. 4

| Broadcasting mode | Application algorithm |
|---|---|
| (S) | Algorithm SS1 which makes condition determination of separation information in stereo mode |
| (B) | Algorithm SS2 which sets division point at switching point of audio mode now broadcasted |
| (M) | Algorithm SS2 which sets division point at switching point of audio mode now broadcasted |
| (Others) | Algorithm SS1 which makes condition determination of separation information in stereo mode |

FIG. 5

| Broadcasting station code | Application algorithm |
|---|---|
| 1001 | Algorithm A1 |
| 1002 | Algorithm B1 |
| Others | Algorithm C1 |

FIG. 6

| Genre code | Application parameter |
|---|---|
| 1001 | Parameter A (Number of compared frames at cut point detection time is 1) |
| 1002 | Parameter B (Number of compared frames at cut point detection time is 4) |
| Others | Parameter C (Number of compared frames at cut point detection time is 2) |

FIG. 7

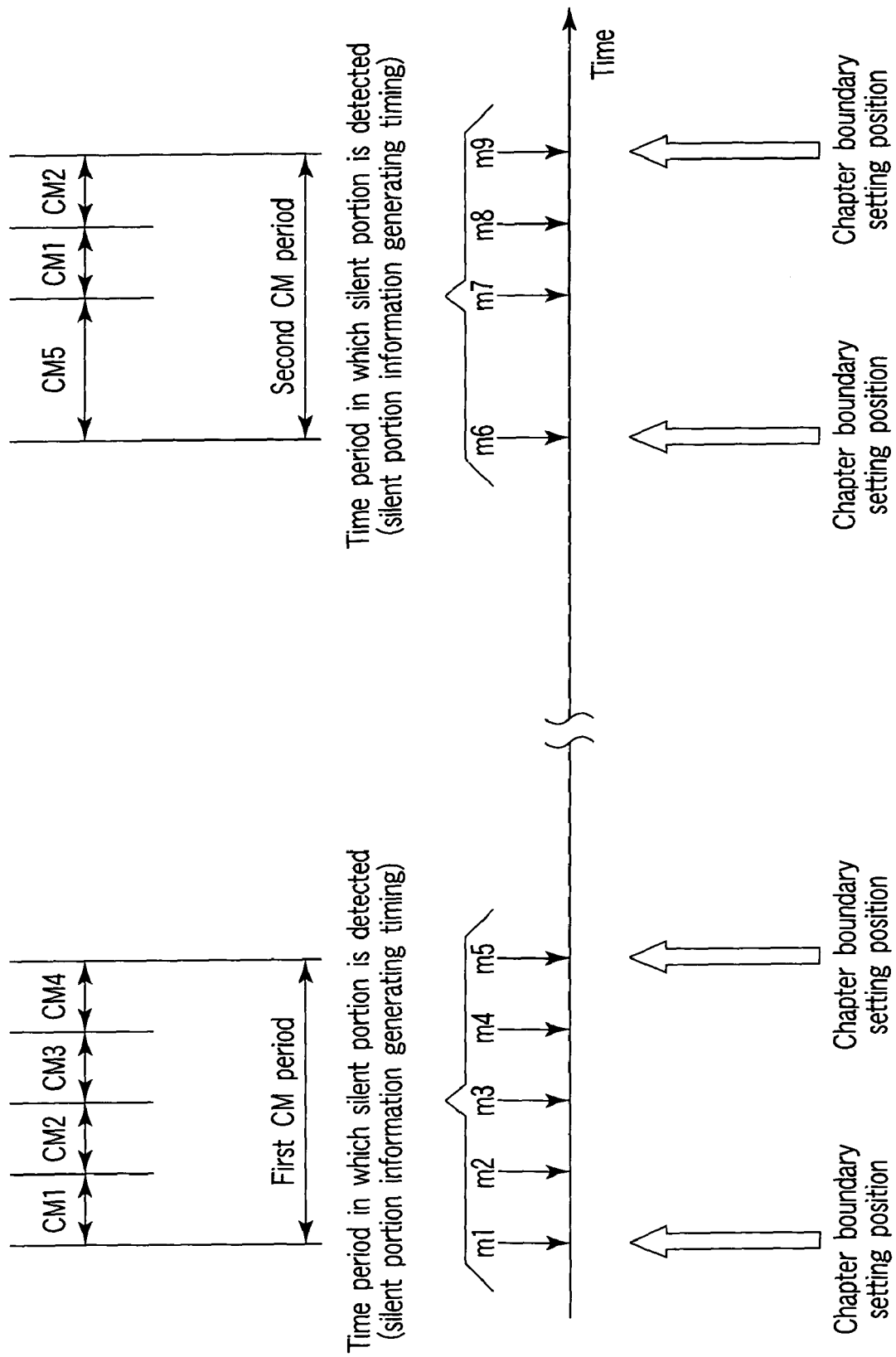
F I G. 9

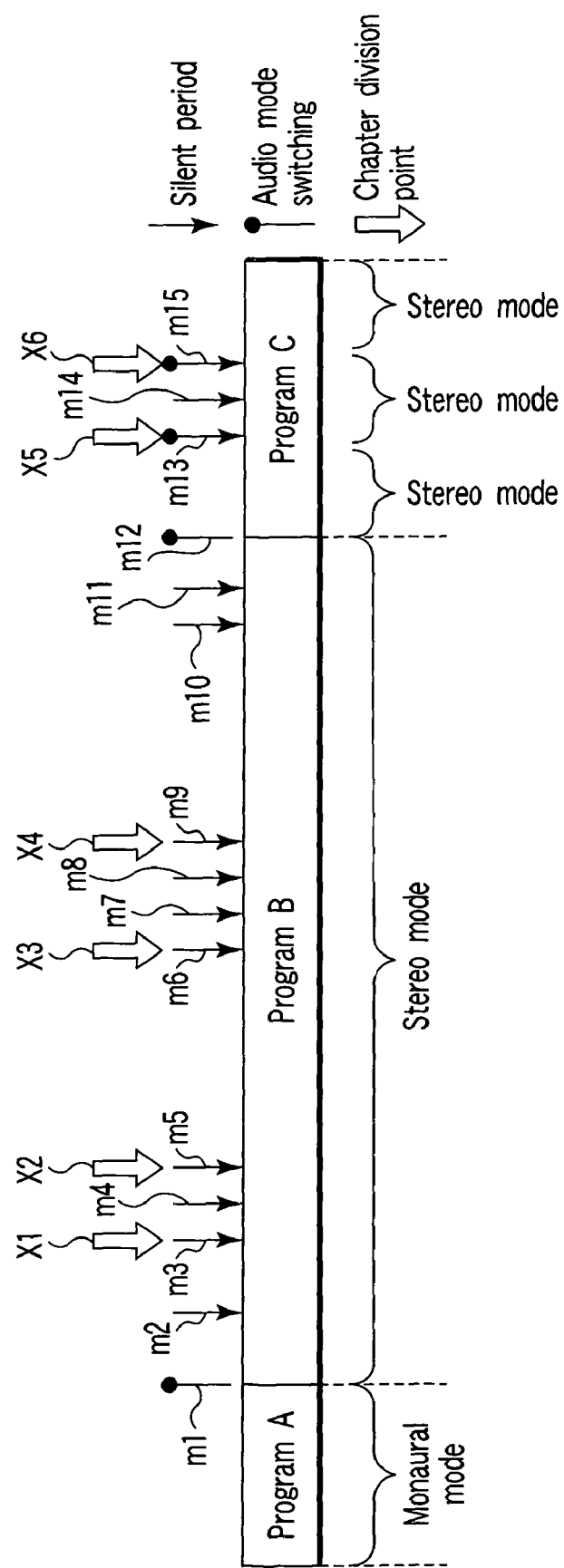
F I G. 14

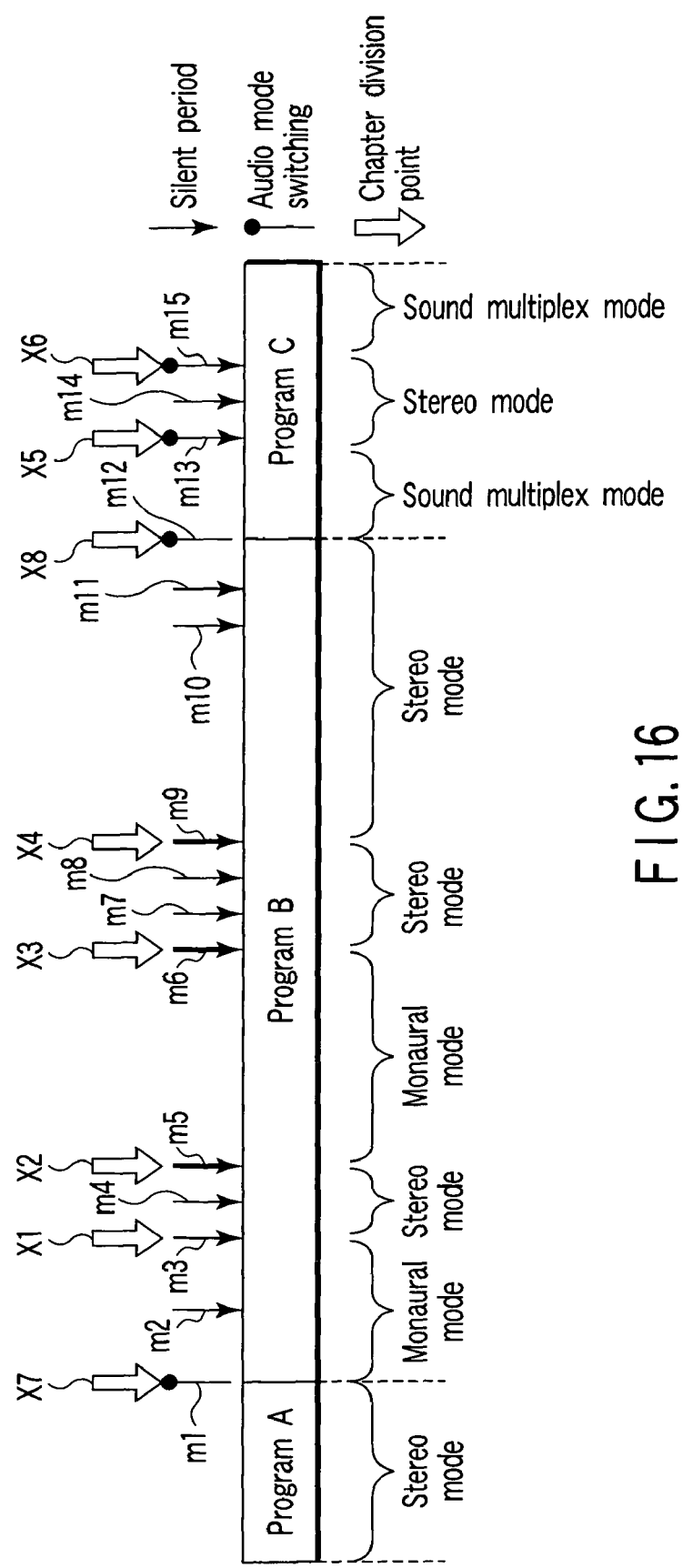
F I G. 16

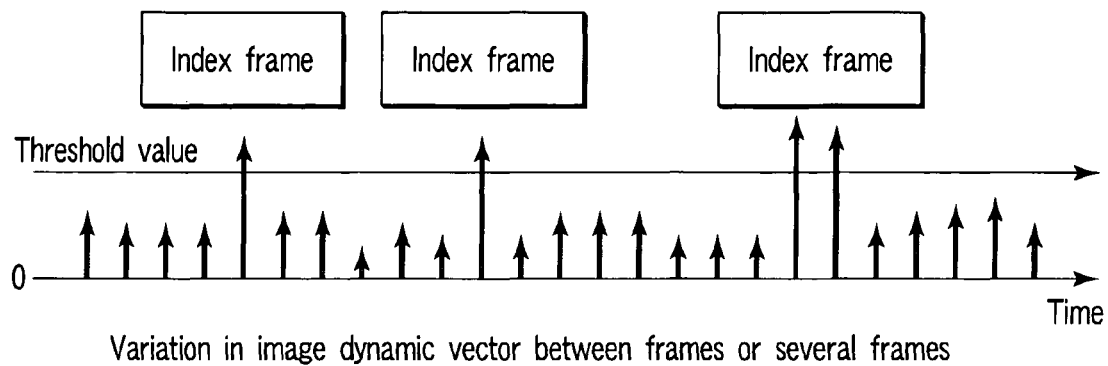
F I G. 21
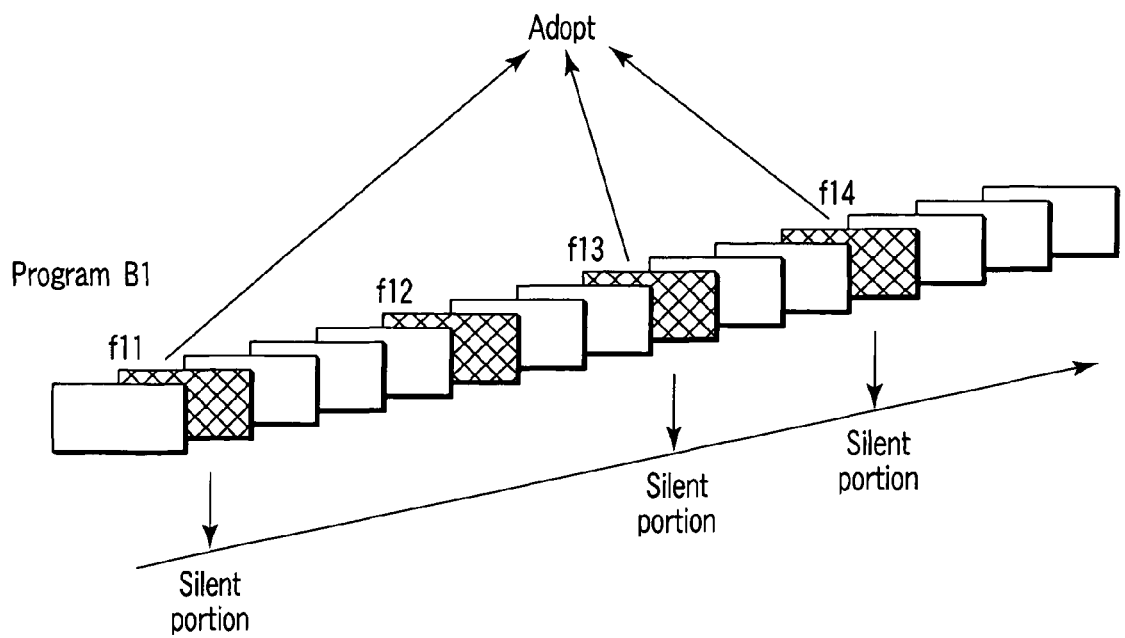
F I G. 22

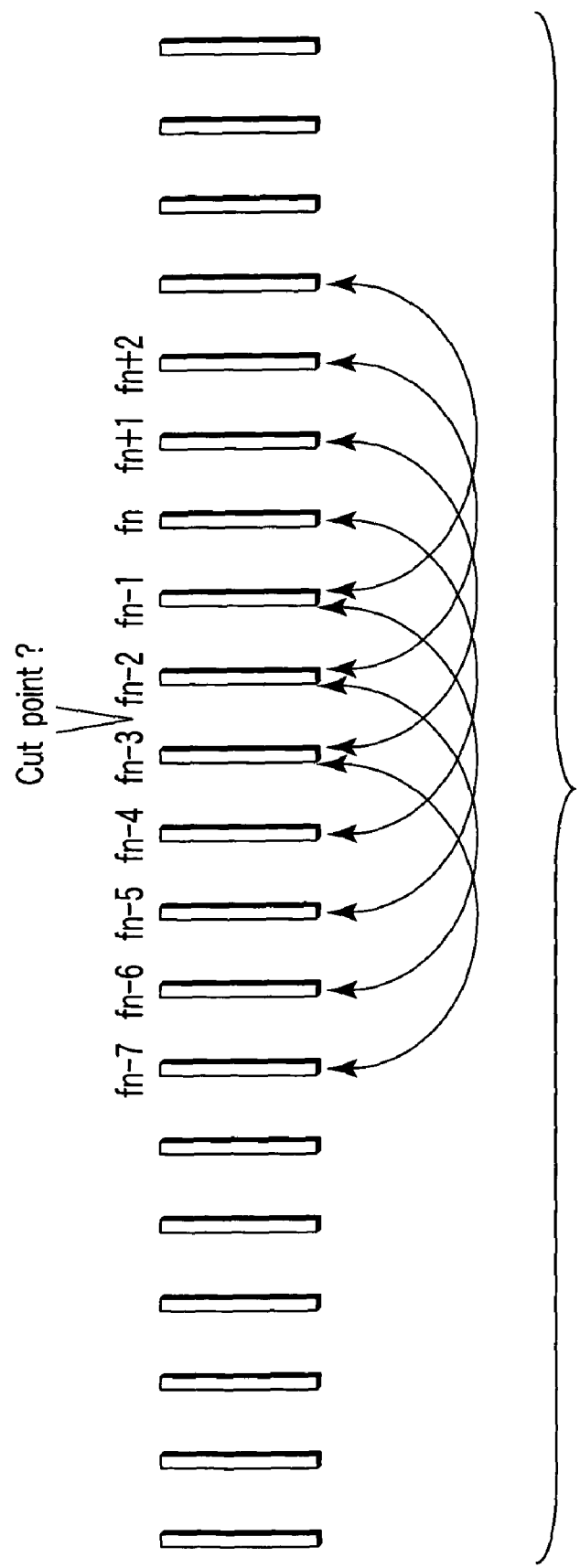
F I G. 23

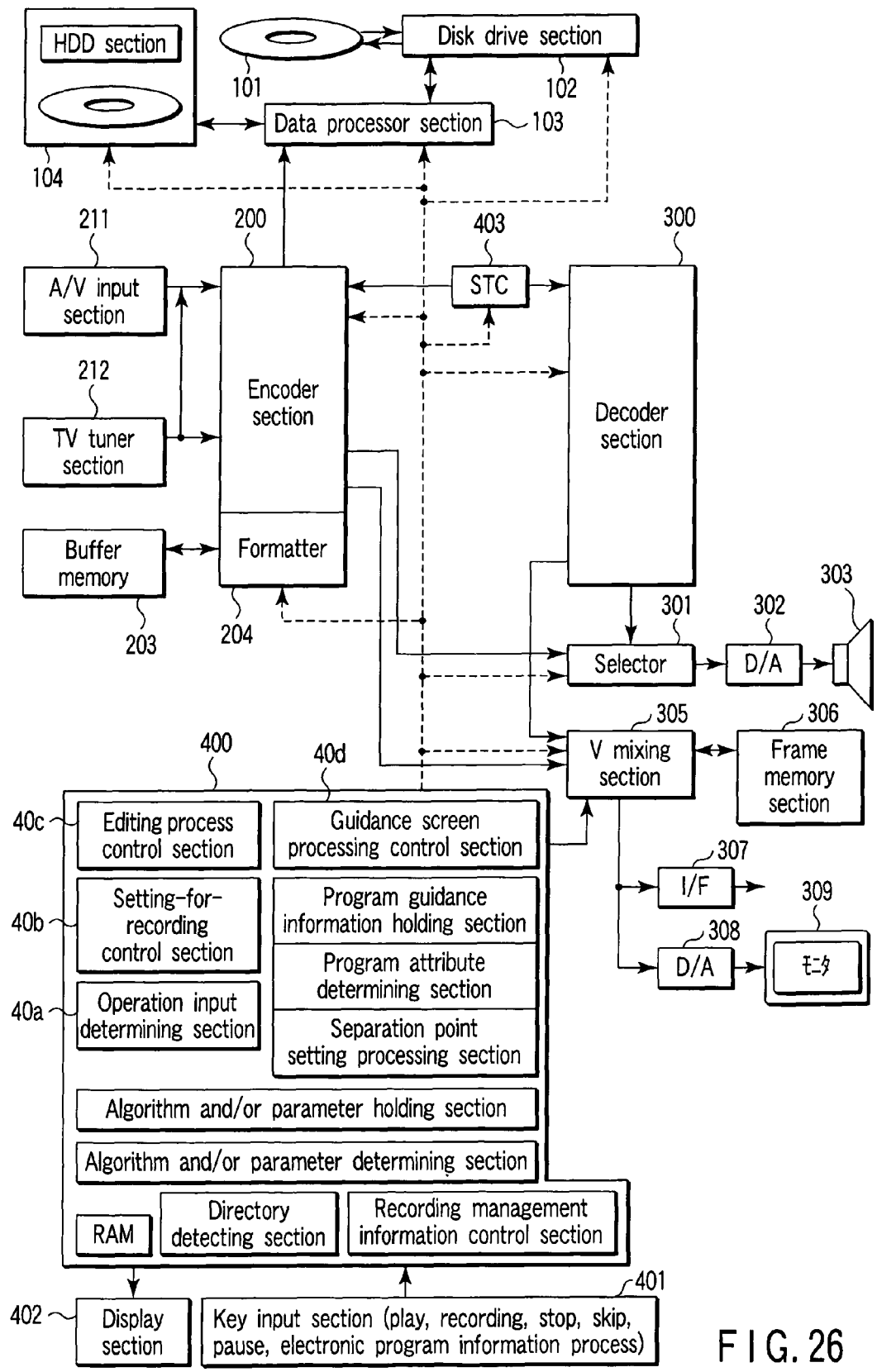
F I G. 26

VIDEO IMAGE RECORDING AND REPRODUCING APPARATUS AND VIDEO IMAGE RECORDING AND REPRODUCING METHOD

CROSS-REFERENCE TO RELATED APPLICATIONS

This application is based upon and claims the benefit of priority from Japanese Patent Application No. 2005-144190, filed May 17, 2005, the entire contents of which are incorporated herein by reference.

BACKGROUND

1. Field

One embodiment of the invention relates to a video image recording and reproducing apparatus having a video image separation processing section and a video image recording and reproducing apparatus and method having a video image separation processing section to structure the video image. That is, this invention relates to a method and apparatus utilized when a video image is structured by acquiring the feature of a video signal and audio signal and detecting a chapter division point, for example.

2. Description of the Related Art

An apparatus which structures a video image by analyzing a composite signal (for example, television broadcast signal) containing a video signal and audio signal is developed. For example, the video image structuring operation includes forming digested video images of characteristic scenes, or the divided chapter or the like. In order to perform the video image structuring operation, it is necessary to detect separation of the video signal, and various methods are developed to serve this purpose.

For example, there is provided a method (for example, Jpn. Pat. Appln. KOKAI Publication No. 2000-101939) which is for determination of a digested segment of the video signal by causing the characteristic amount of an audio signal to be associated with genre information. Further, there is provided a method (for example, Jpn. Pat. Appln. KOKAI Publication No. 2003-283993) which is for determination of a digested video image (digest) by causing genre information to be associated with a characteristic scene of a video signal. In addition, there is provided a method (for example, Jpn. Pat. Appln. KOKAI Publication No. 2003-283993) which is for measurement of the degree of similarity between a segment used as a reference of a video signal and a characteristic amount of another segment and detection of a boundary between segments which become non-similar.

Further, there is provided a method (for example, Jpn. Pat. Appln. KOKAI Publication No. H9-93588) for analysis of the behavior of dynamic vector data acquired at the moving picture compression time and detection of a variation point of image contents. Also, there is provided a method (for example, Jpn. Pat. Appln. KOKAI Publication No. H9-0214879) which is for detection of a portion in which a silent portion and discontinuous point coincide with each other by use of detection information of a discontinuous point of a moving picture and detection information of a silent portion and set the detected portion as a separation point of the video signal. In addition, there is provided a method which for detection of scene changing points of a recorded moving picture. However, if all of the scene changing points are used, the number of scene changing points becomes excessively large. Therefore, there is provided a method for measuring the degree of similarity between an image of a scene changing point and an image of another scene changing point of the recorded moving picture. If a portion having a high degree of similarity is detected, it is determined that the detected portion has a significance and is a changing point of the program, and an index image of the portion is formed (for example, Jpn. Pat. Appln. KOKAI Publication No. H11-259061).

In the above technique, a chapter dividing process for a program of a preset genre is satisfactorily performed. However, there is a problem that precise chapter dividing process for programs of various genres cannot be always attained.

BRIEF SUMMARY OF THE INVENTION

According to one embodiment of the invention, it is to provide a video image recording and reproducing apparatus and method with which a process of dividing a chapter or the like can be stably performed according to the attributes of a program. In this case, the attributes of the program in this invention contain various contents of a genre, broadcasting mode, broadcasting station code and the like.

In order to attain the above object, according to the embodiment of the invention, there is provided a video image recording and reproducing apparatus which forms a separation point with respect to video data of a broadcasting program according to a preset analysis algorithm and comprises a holding section which holds a plurality of analysis algorithms used to form separation points, an acquiring section which acquires electronic program guidance information containing attribute information relating to the broadcasting program, and a separation point formation processing section which selectively switches the plurality of analysis algorithms according to the attribute information to form a separation point of the video data. The separation point formation processing section may use at least one of the broadcasting mode, broadcasting station code and program genre as the attribute information. Further, the separation point formation processing section can determine a first algorithm for the broadcasting code, a second algorithm for the broadcasting station code and a third algorithm for the program genre when the analysis algorithm is determined by using all of the program broadcasting code, broadcasting station code and program genre.

Additional objects and advantages of the embodiment will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary diagram for illustrating one example of a format used to express program guidance information (EPG information);

FIG. 3 is an exemplary diagram showing a concrete example of EPG information expressed by use of the above format;

FIG. 4 is an exemplary diagram showing a table of EPG information;

FIG. 5 is an exemplary diagram showing an example of the table of an algorithm according to the embodiment;

FIG. 6 is an exemplary diagram showing an example of the table of another algorithm according to the embodiment;

FIG. 7 is an exemplary diagram showing an example of the table of still another algorithm according to the embodiment;

FIG. 9 is an exemplary diagram for illustrating a principle of chapter division utilizing a silent portion detecting process according to the embodiment;

FIG. 14 is an exemplary diagram showing an example of switching points of an audio mode of an audio signal contained in a composite signal and positions of silent portions of the audio signal, for illustrating an example of the operation of the apparatus of the embodiment;

FIG. 16 is an exemplary diagram showing another example of switching points of an audio mode of an audio signal contained in a composite signal and points of silent portions of the audio signal, for illustrating a further example of the operation of the apparatus of the embodiment;

FIG. 21 is an exemplary diagram for illustrating another example of an algorithm when a scene change is detected in the apparatus of the embodiment;

FIG. 22 is an exemplary diagram for illustrating still another example of an algorithm when a scene change is detected in the apparatus of the embodiment;

FIG. 23 is an exemplary diagram for illustrating an example of an algorithm when a scene change or cut point is detected in the apparatus of the embodiment;

FIG. 26 is an exemplary diagram showing an example of the configuration of a recording and reproducing apparatus to which the invention is applied.

DETAILED DESCRIPTION

Figure 1:
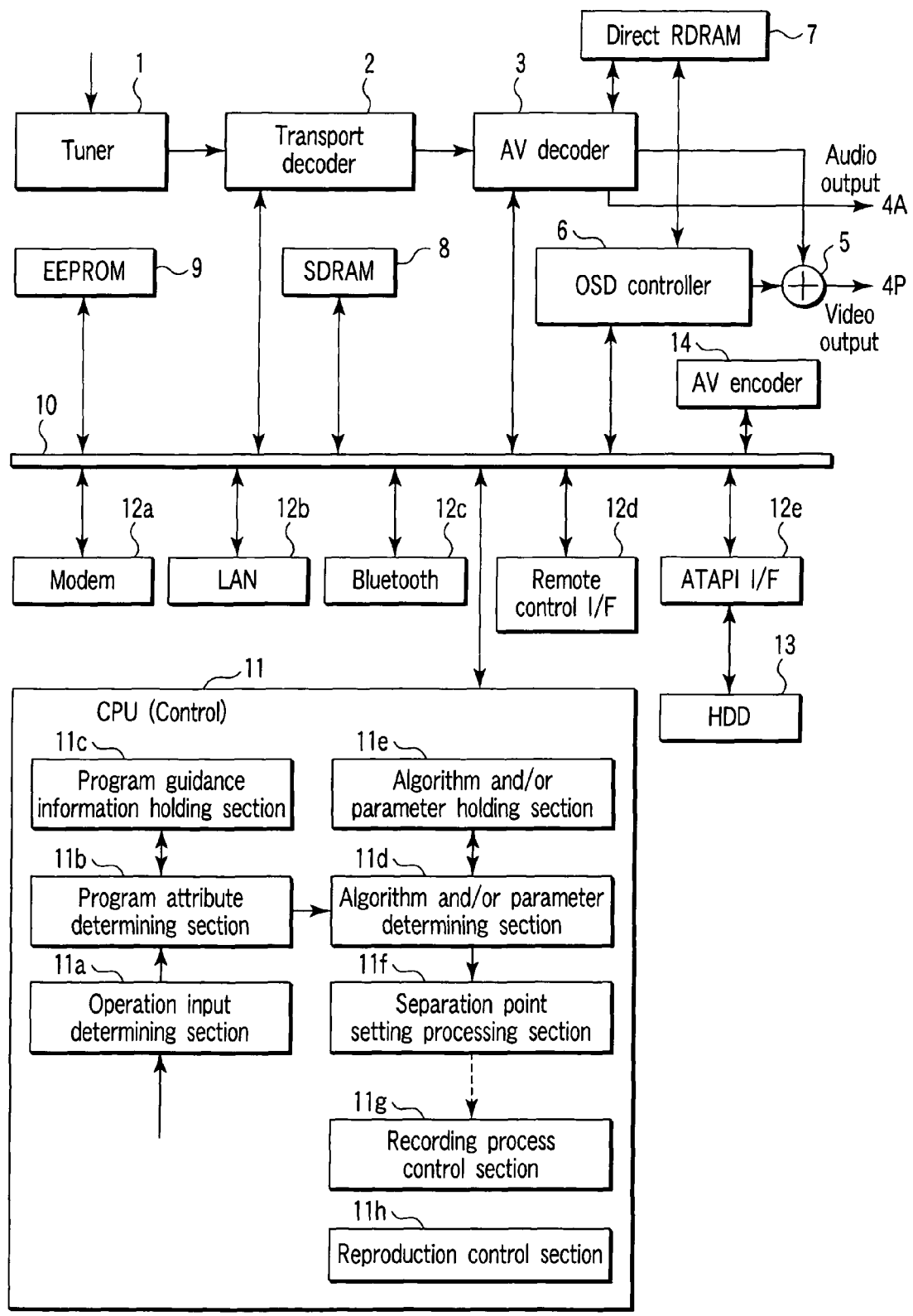
FIG. 1 is an exemplary diagram showing the basic configuration of a first embodiment of one embodiment of the invention.

There will now be described embodiments of this invention with reference to the accompanying drawings. FIG. 1 is a diagram showing an example of the configuration of a signal processing apparatus to which this invention is applied. For example, the signal processing apparatus can be applied to a digital television receiver, information recording and reproducing apparatus or the like.

For example, a tuner 1 receives a digital broadcasting signal, demodulates the received signal and supplies a demodulated output to a transport decoder 2. A video signal/audio signal of a program selected by the transport decoder 2 is input to and demodulated by an audio video (AV) decoder 3 for each packet. An audio output demodulated by the AV decoder 3 is output to an output terminal 4A and a video output is output to an output terminal 4P. A video signal of the output terminal 4P is synthesized with a video signal from an on-screen display (OSD) controller 6 in a synthesizing circuit 5 in some cases.

A direct RDRAM 7 is used to temporarily store data from the AV decoder 3 or OSD controller 6. For example, an SDRAM 8 is used to temporarily store data when the received signal is subjected to an error correction process. For example, an EEPROM 9 is used to hold a program or parameters used to execute the function of the apparatus.

A main bus 10 is connected to the transport decoder 2, AV decoder 3, OSD controller 6, SDRAM 8, EEPROM 9 and the like. A CPU 11 which is a control section generally controlling the whole portion of the apparatus is connected to the main bus 10. Further, the apparatus can be connected to external equipment via the main bus 10. For this purpose, the main bus 10 is connected to a modem interface 12a, LAN terminal 12b, Bluetooth interface 12c, remote control interface 12d and ATAPI interface 12e. The main bus can be connected to a hard disk drive 13 via the interface 12e. Further, an AV encoder 14 is connected to the main bus 10 and a video signal can be converted into a preset format (for example, DVD standard) so as to be recorded on a recording medium.

The CPU 11 is a computer block having a plurality of integrated computers. An operation input determining section 11a which determines an operation input from a remote controller and a program attribute determining section 11b for an object program are provided in the CPU 11. The program attribute determining section 11b recognizes a program genre, broadcasting mode, broadcasting station code or the like. Further, a program guidance information holding section 11c (acquiring section) which acquires and holds received program guidance information and an algorithm and/or parameter holding section (holding section) 11e are provided. The holding section 11e holds plural types of algorithms and/or parameters. They are selected according to the attributes of the programs.

An algorithm and/or parameter determining section 11d determines an algorithm and/or parameter corresponding to the attribute of the program when the program attribute determining section 11b recognizes the program and specifies the attribute of the program. Then, the thus determined algorithm and/or parameter is used when the separation point (division point) of the program is set.

Further, the control section 11 also includes a recording process control section 11g and reproduction control section 11h. The recording process control section 11g records a composite signal in a preset format (for example, DVD format) on a recording medium, for example, a hard disk specified in the recording mode. At this time, of course, management information used to reproduce the composite signal is formed and recorded on the recording medium. In the management information, a separation point (chapter division point) from the separation point setting processing section 11f is contained as entry point information, for example. With the above configuration, the holding section holds a plurality of analysis algorithms used to form separation points and the acquiring section acquires electronic program guidance information containing attribute information associated with the broadcasting program. Then, the separation point formation processing section selectively switches the plurality of analysis algorithms according to the attribute information to form separation points of the video data.

FIG. 2 shows a format used to express information of EPG based on program guidance information (which is called EPG information). Data is text expressed in CSV form. For example, data is arranged in the form of "program identification number, broadcasting station mode, broadcasting station name, broadcasting date, start time, end time, genre code, broadcasting mode, program name, subtitle, cast, corner information, detail information". FIG. 3 shows an example in which information is described in detail. Concrete information is extracted from sample items of a table shown in FIG. 4.

In FIG. 5, application algorithms selected according to the broadcasting modes are described in the table. The application algorithm set when the broadcasting mode is (S) (stereo) is an algorithm SS1 which determines the condition of a silent portion detecting point in the stereo mode and sets the separation point based on the result. The application algorithm set when the broadcasting mode is (B) (bilingual) is an algorithm SS2 which sets a division point at the switching point of the audio mode. Like the case of (B), the application algorithm set when the broadcasting mode is (M) (sound multiplex) is the algorithm SS2 which sets a division point at the switching point of the audio mode. Like the case of [S], the application algorithm set when the broadcasting mode is [others] is the algorithm SS1 which determines the condition of a silent portion detecting point in the stereo mode and sets the separation point based on the result. The algorithms SS1, SS2 are described later.

In FIG. 6, application algorithms selected according to the broadcasting modes are described in the table. When the broadcasting station mode is "1001", an algorithm A1 is selected, when the broadcasting station mode is "1002", an algorithm B1 is selected, and when the broadcasting station mode is "others", an algorithm C1 is selected. The algorithms A1, B1, C1 are described later.

In FIG. 7, application algorithms (parameters) selected according to the genre codes are described in the table. When the genre code is "0001", a parameter A is set (for example, the compared frame number at the time of cut point detection=1). When the genre code is "0002", a parameter B is set (for example, the compared frame number at the time of cut point detection=4). When the genre code is "others", a parameter C is set (for example, the compared frame number at the time of cut point detection=2).

Figure 8:
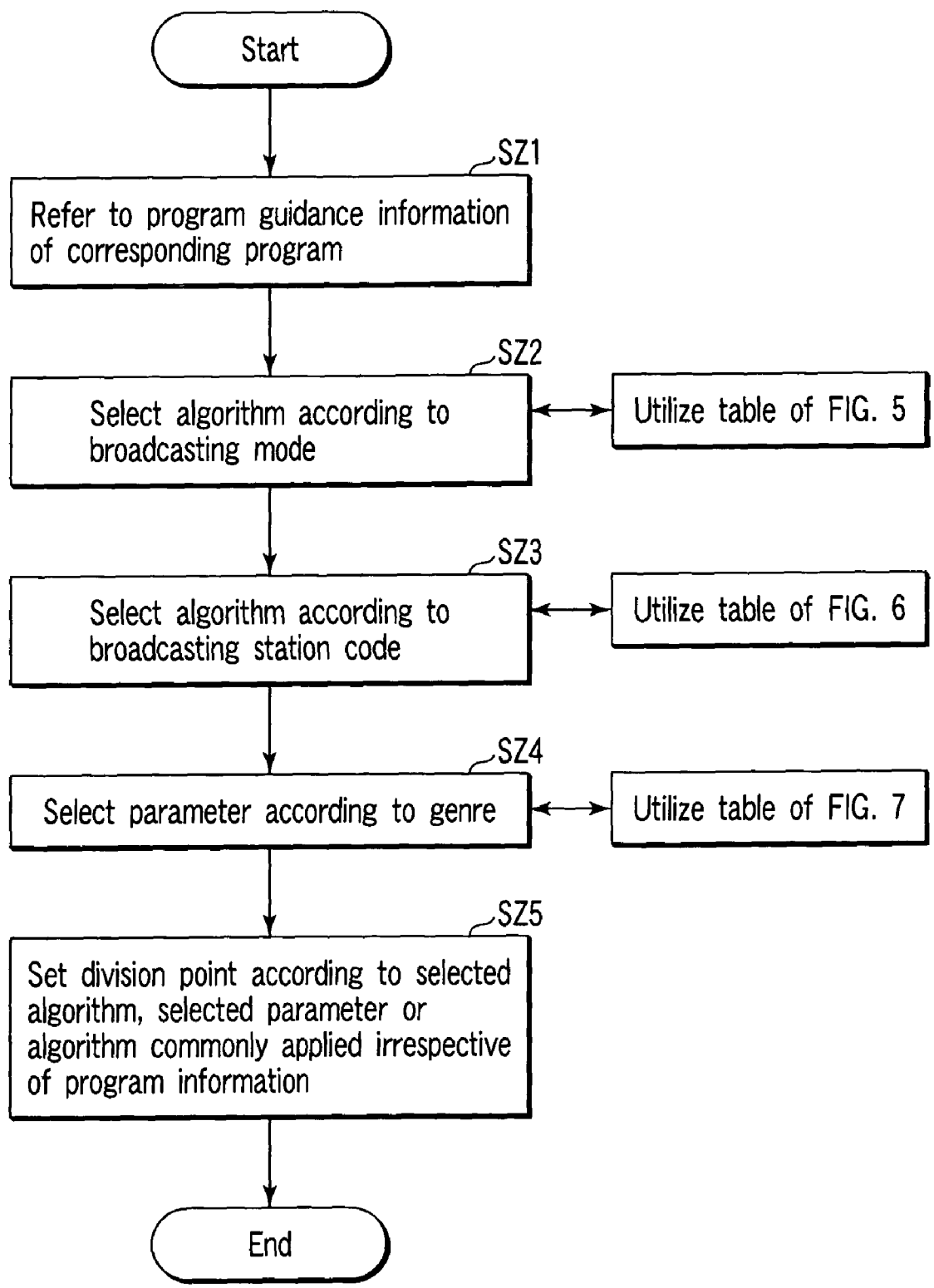
FIG. 8 is an exemplary flowchart for illustrating a setting procedure of a division point processing algorithm according to the embodiment.

In FIG. 8, a flowchart showing the way of determining the above algorithm or parameter is shown. First, program guidance information of a program to be now recorded is referred to (step SZ1). The referring process corresponds to a process of referring to the table of FIG. 4. Thus, program attributes of a program to be recorded can be specified. The program attributes correspond to the broadcasting mode, broadcasting station mode and genre code shown in FIGS. 5, 6 and 7.

When the broadcasting mode is specified, an application algorithm is selected from the table shown in FIG. 5 (step SZ2). Next, an application algorithm is selected from the table shown in FIG. 6 according to the broadcasting station mode (step SZ3). Then, an application algorithm is selected from the table shown in FIG. 7 according to the genre code (step SZ4).

The algorithm specified as described above is used in the separation point setting processing section 11f. Then, the final separation point (chapter division point) is determined (step SZ5) and the information is supplied as entry point information to the recording process control section 11g.

In FIGS. 9 to 12, a method which detects a separation point of a composite signal of the program by use of an audio signal is shown. The method corresponds to the algorithm SS1 of the table of FIG. 5. The method effectively functions even when the main body portion of the program is a stereo mode. A silent portion is detected, the time interval between adjacent silent portions is measured and if the time interval satisfies a preset condition (that the time interval is a multiple of 15 sec), it is determined that the detected silent portion is a related silent portion. The method sets separation points at the first and last ones of a plurality of related silent portions.

FIG. 9 shows an example in which two commercial periods are present in one program (for example, a program set for recording), for example.

In this case, an example in which four commercials of CM1, CM2, CM3, CM4 are broadcasted in the first commercial period and three commercials of CM5, CM1, CM2 are broadcasted in the second commercial period is shown.

For example, when attention is paid to the first commercial period, the silent period is provided in the separation portion of each commercial, and therefore, a silent portion detection flag is acquired. However, since the condition which will be described later is not satisfied after CM4, the end of CM4 is determined as a chapter boundary position. Further, the position of the silent portion detection flag immediately before starting the first CM1 is set as the chapter boundary. That is, flags each indicating the chapter boundary are obtained before and after the commercial period. Likewise, the chapter boundaries are not set in all of the silent portions in the second commercial period, a plurality of CMs (which are continuously broadcasted) which satisfy the preset condition are set into groups and the chapter boundary is set with the group used as one unit.

Figure 10:
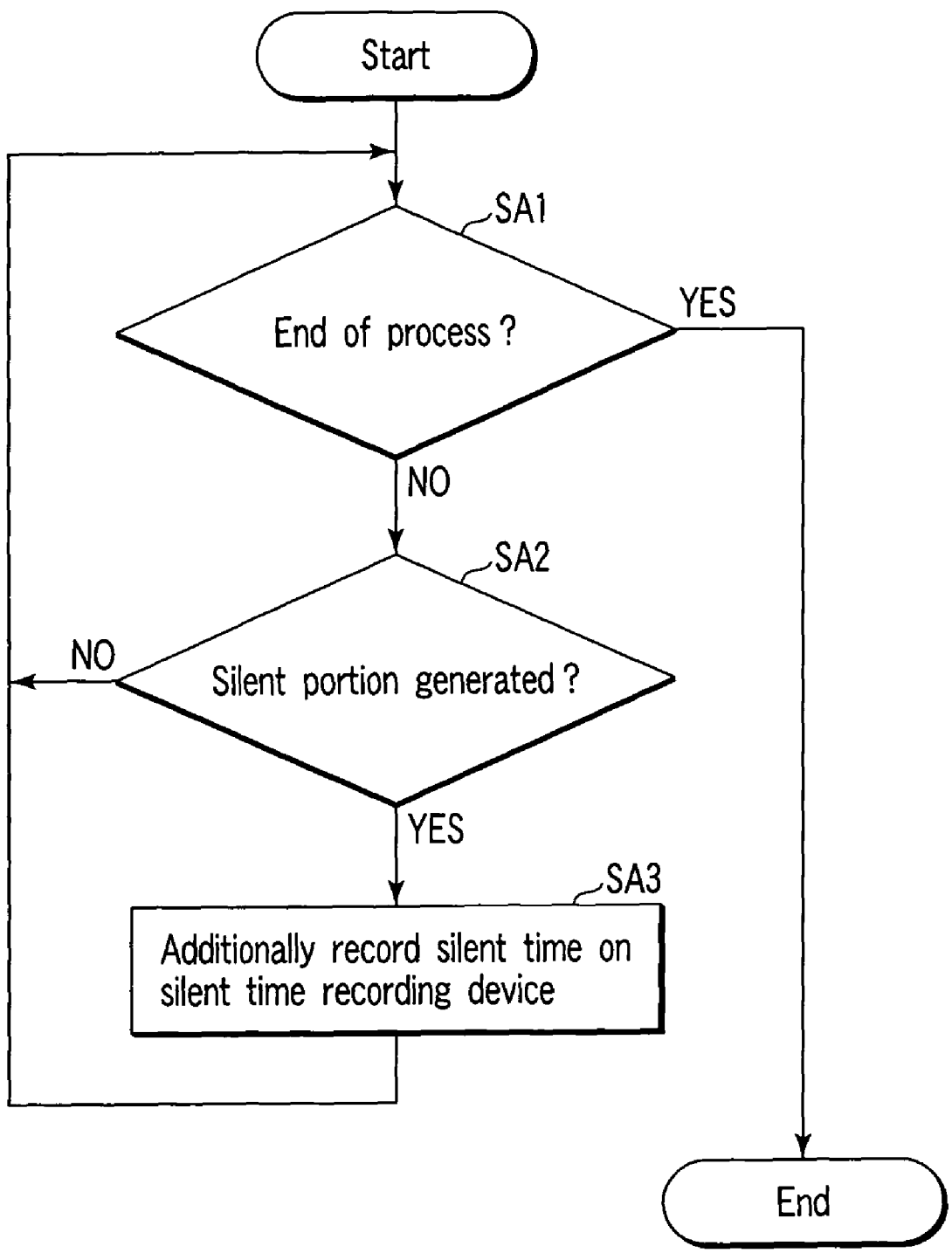
FIG. 10 is an exemplary flowchart for illustrating a silent portion detecting operation.

FIG. 10 shows the step of the above process by use of a large block. Whether a chapter setting process for one program is ended or not is determined (step SA1), and if it is not ended, a silent potion detecting process is performed to detect a silent portion (step SA2). If a silent portion is detected, time at which the silent portion is detected is stored as described before (step SA3). When management information is processed at the end of the program, the chapter boundary is set as an entry point in the management information as explained in FIG. 2.

Figure 11:
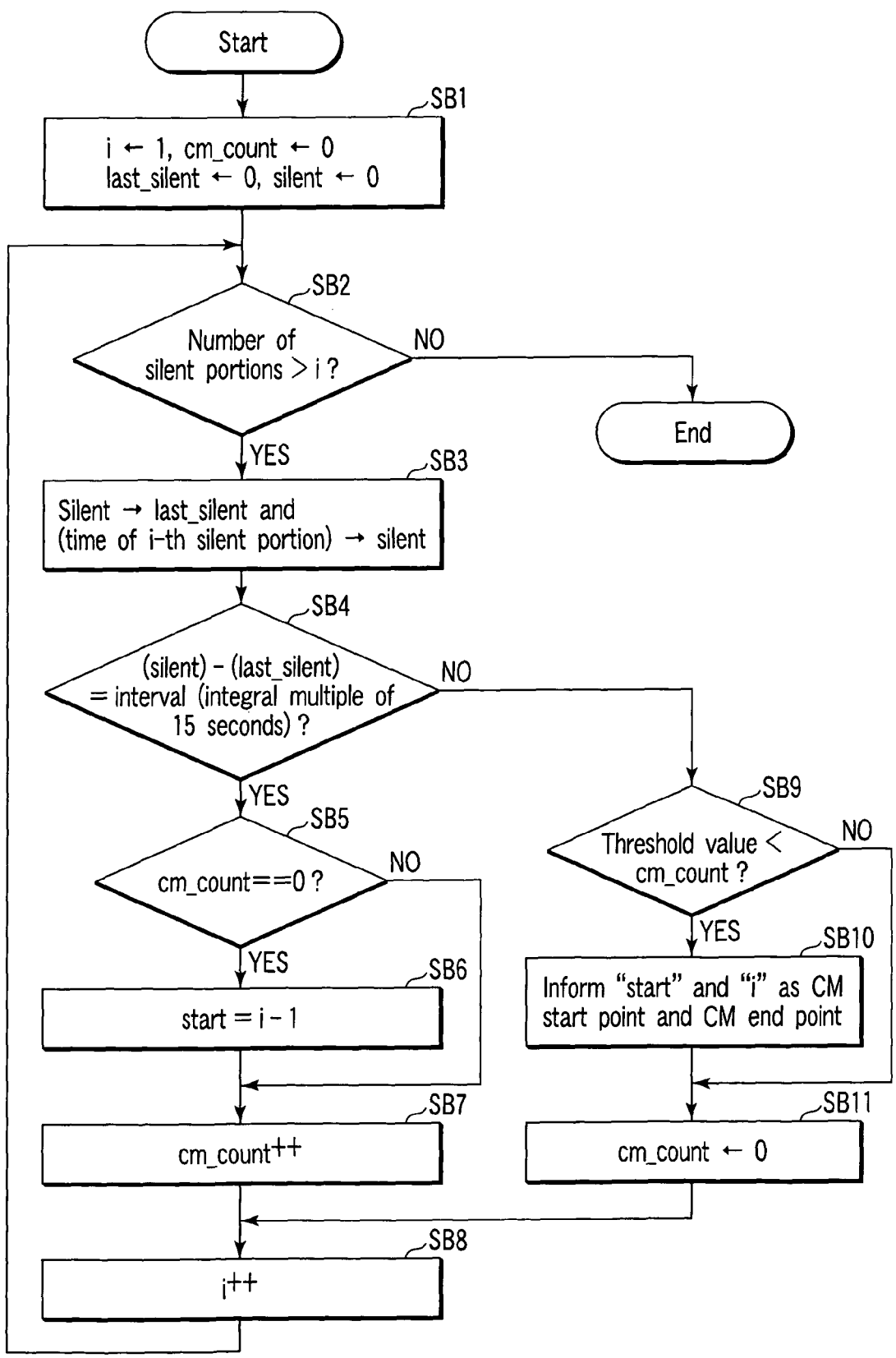
FIG. 11 is an exemplary flowchart for illustrating a silent portion detecting operation and chapter division point setting operation.

FIG. 11 is a flowchart for illustrating a process of determining a chapter boundary at the CM start point and a chapter boundary at the CM end point when silent portions are successively detected in the commercial period. When the process starts, first, i is used as information indicating the order of silent portions when the silent portion is detected. When the first silent portion is detected, i is set to "1". Further, at this time, a CM count value (cm_count) is set to "0", time (last_silent) of the last silent portion is set to "0", and time (silent) of a silent portion next detected is set to "0" (step SB1).

If the number of silent portions is smaller than i when a silent portion is detected, the preceding time (silent) is set to last_silent and the present time (silent) is set to time of the i-th silent portion (steps SB2, SB3). Then, the calculation of "(silent)–(last_silent)" is made and whether or not the result of the calculation is a value which is an integral multiple of 15 seconds is determined (step SB4). This is because commercials are broadcasted in units of 15 sec or an integral multiple of 15 sec in many cases.

If the result of the calculation is 15 sec (value A) or an integral multiple of 15 sec, whether cm_count is "0" or not is determined (step SB5). When it is "0", it indicates that it is the time immediately after the commercial count is started. Since (i-1) corresponds to the commercial start time, (i-1) is set to "start" (step SB6).

If it is detected in the step SB5 that cm_count is not "0", it indicates that the commercial period has already started and cm_count is incremented by +1 (step SB7). After the step SB7, the process of (i+1) is performed (step SB8) and then the process returns to the step SB2.

If it is detected in the previous step SB4 that the result of the calculation of "(silent)–(last_silent)" is not the integral multiple of 15 sec (value A), it is regarded that it is not the commercial time period. At this time, whether the condition that cm_count accumulated so far is larger than a threshold value (B) is satisfied or not is determined (step SB9). When the above condition is satisfied, it is determined that a plurality of commercial groups are broadcasted and the time point of "start" at the present time and the time point at which the present value "i" accumulatively added is obtained are respectively set as the CM start point and CM end point and informed to a chapter boundary setting device (step SB10). After this, cm_count=0 and i=0 are set (step SB11).

The constant time (value A) can be made variable. In order to make the value A variable, a specially set user guidance menu is prepared to make the value variable. Further, the threshold value (B) may have a preset margin.

Figure 12:
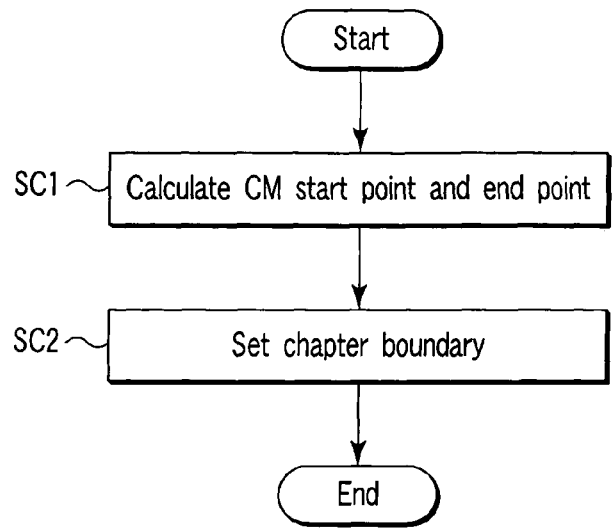
FIG. 12 is an exemplary flowchart for illustrating an operation of setting a chapter division point by performing a CM detecting process by use of the above silent portion detecting process.

FIG. 12 is a flowchart for illustrating an operation of a chapter boundary setting device 28. The procedure of acquiring information of the CM start point and information of the CM end point (step SC1) and setting a chapter boundary (step SC2) is shown.

As described above, according to the method and apparatus of this invention, silent portions are detected in the commercial broadcasting period and the start position and end position of a plurality of successive commercials (successive commercial groups) are detected without setting all of the detected positions thereof as chapter boundaries.

The process explained in FIGS. 9 to 12 is the algorithm SS1 of the table shown in FIG. 5. The process of detecting silent portions is performed by supplying demodulated audio data to a slice circuit which slices the data at a preset threshold value. Then, the position of existence of the audio data whose input level is lower than the threshold value is detected as a silent portion.

FIGS. 13 to 19 are diagrams for illustrating a signal process corresponding to the contents of the algorithm SS2 shown in FIG. 5.

Figure 13:
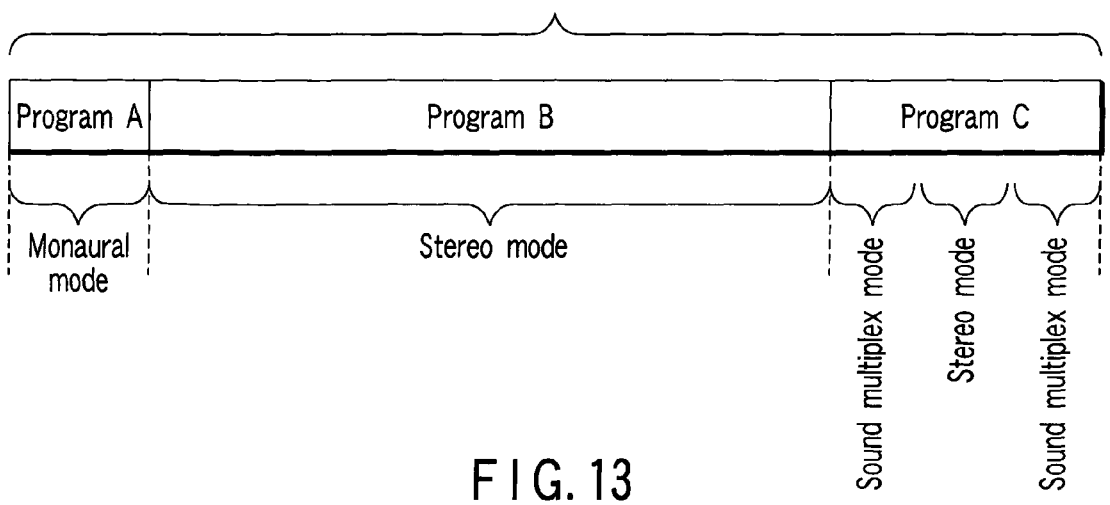
FIG. 13 is an exemplary diagram showing an example of an audio mode of an audio signal contained in a composite signal, for illustrating the operation of the apparatus of the embodiment.

First, the technique used as the preposition of the contents of the algorithm SS2 is explained with reference to FIGS. 13, 14. FIG. 13 shows an example in which various audio modes including a monaural mode, stereo mode and sound multiplex mode are contained together in an audio signal contained in a broadcasted composite signal. In this case, the composite signal indicates a signal which contains both of the video signal and audio signal. In FIG. 13, a state in which a program A (monaural audio mode), program B (stereo audio mode) and program C (sound multiplex mode and stereo mode are provided together) are sequentially recorded and processed is shown.

In FIG. 14, a state in which the above audio signal is analyzed to form separation information is shown. In this case, positions to which marks m1, m12, m13, m15 are attached indicate positions in which the audio mode is switched. Positions to which marks m2 to m11, m13, m14, m15 are attached indicate positions in which silent portions are detected. In the stereo mode, a function of detecting silent portions is contained. The function sets chapter division points in the first and last silent portions of the successive silent portions when the condition that all of the adjacent intervals of, for example, three or more successive silent portions are an integral multiple of constant time period (for example, 15 sec) is satisfied. The concrete process of the function is as explained before.

In FIG. 14, since the successive marks m3, m4, m5 satisfy the above condition, chapter division points (separation information items) x1, x2 are set. Further, since the marks m6 to m9 also satisfy the above condition, chapter division points (separation information items) x3, x4 are set. In addition, since the marks m13, m14, m15 satisfy the above condition, chapter division points (separation information items) x5, x6 are set.

In this example, when the main body portion is set in a stereo mode, a portion in which the audio level is lower than the threshold level for a preset period of time is determined as a silent portion. Further, whether or not or not the time interval between the silent portion and a next silent portion is an integral multiple of constant time period (A) is determined. Then, if the time interval is an integral multiple of the constant time period (A), the number of detection times of the silent portions is counted and if the count becomes equal to or larger than the threshold value (B), separation information items are set for the first and last silent portions.

Figure 15:
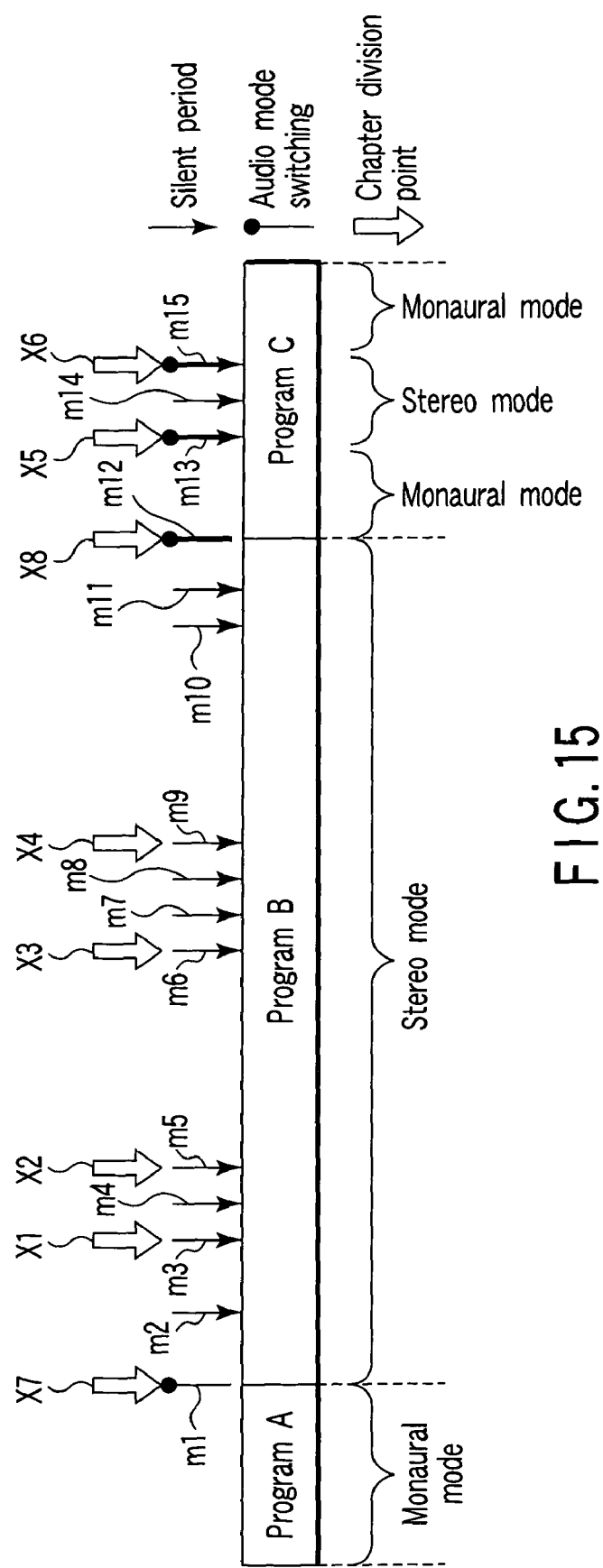
FIG. 15 is an exemplary diagram showing an example of switching points of an audio mode of an audio signal contained in a composite signal, points of silent portions of the audio signal and division points set thereon according to a rule, for illustrating an example of the operation of the apparatus of the embodiment.

FIG. 15 shows an embodiment for the algorithm SS2. Portions of FIG. 15 which are the same as those of FIG. 14 are denoted by the same reference symbols as those of FIG. 14. In this example, chapter division points (separation information items) x7, x8 are set in the switching portions of the audio modes in addition to the example of FIG. 14. In the preset embodiment, separation information can also be attached to the boundary of the program.

In an example of FIG. 16, separation information is set for each switching of audio modes when the main body portion is not set in the stereo mode. Of course, the determination method performed in the case of the stereo mode of FIG. 15 is also used. That is, even if the main body portion is not set in the stereo mode, a commercial portion is set in the stereo mode and a plurality of commercials are broadcasted with silent portions disposed therebetween in some cases. In such a case, marks are set for all of the silent portions, but separation information items are set in the head and end of the commercial portion. In the case of this example, separation information is set only in a switching portion of the audio modes.

Figure 17:
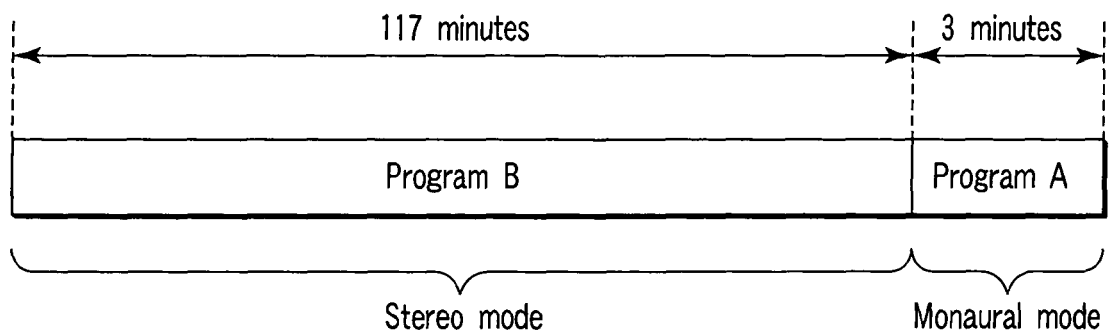
FIG. 17 is an exemplary diagram showing an example of calculation of a preset rate of a specified audio mode among a plurality of audio modes of an audio signal contained in a composite signal.
Figure 18:
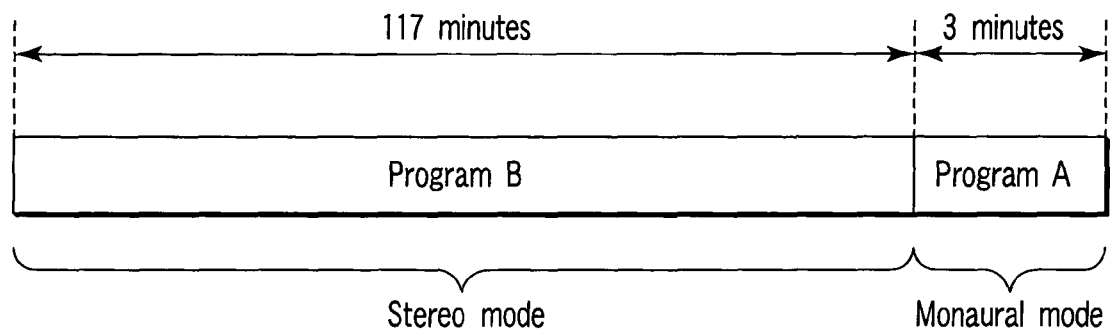
FIG. 18 is an exemplary diagram showing another example of calculation of a preset rate of a specified audio mode among a plurality of audio modes of an audio signal contained in a composite signal.

FIGS. 17, 18 show examples of a method for determining whether a program of the main body portion is the stereo mode or monaural mode. When the main body portion is set in the stereo mode, both of detection of mode changing points and silent portion detection points can be utilized in combination.

FIG. 17 shows an example in which the ratio of the monaural mode to the stereo mode of an audio signal is measured. In this invention, whether or not the total length or ratio when the audio signal is set in the monaural mode (first mode) is not larger than preset length or preset ratio is determined. The preset ratio is set in a range of (3/120) to (1/2). If the monaural mode is set in a range of three minutes to one hour in a two-hour (120-minute) program, it is determined that the main body portion is set in the stereo mode. This is because a 3-minute monaural program, for example, a news program may be contained in some cases. Further, this is because inconsistency with respect to the determination result will occur if the ratio of an interval in which the stereo mode is not set becomes 1/2 or more.

FIG. 18 is an explanatory diagram showing a method of acquiring simplified calculation when the ratio of the length (for example, three minutes) of the interval of the monaural mode to the two-hour program (the length of the whole video image) is calculated. For calculation, 120 minutes×1/2$^n$ is calculated and the result of calculation is compared with three minutes. 1/2$^n$ can be easily calculated by use of a computer. In order to calculate 120 minutes×1/2$^n$, 120 may be expressed by use of a binary number and then shifted by n bits.

Figure 19:
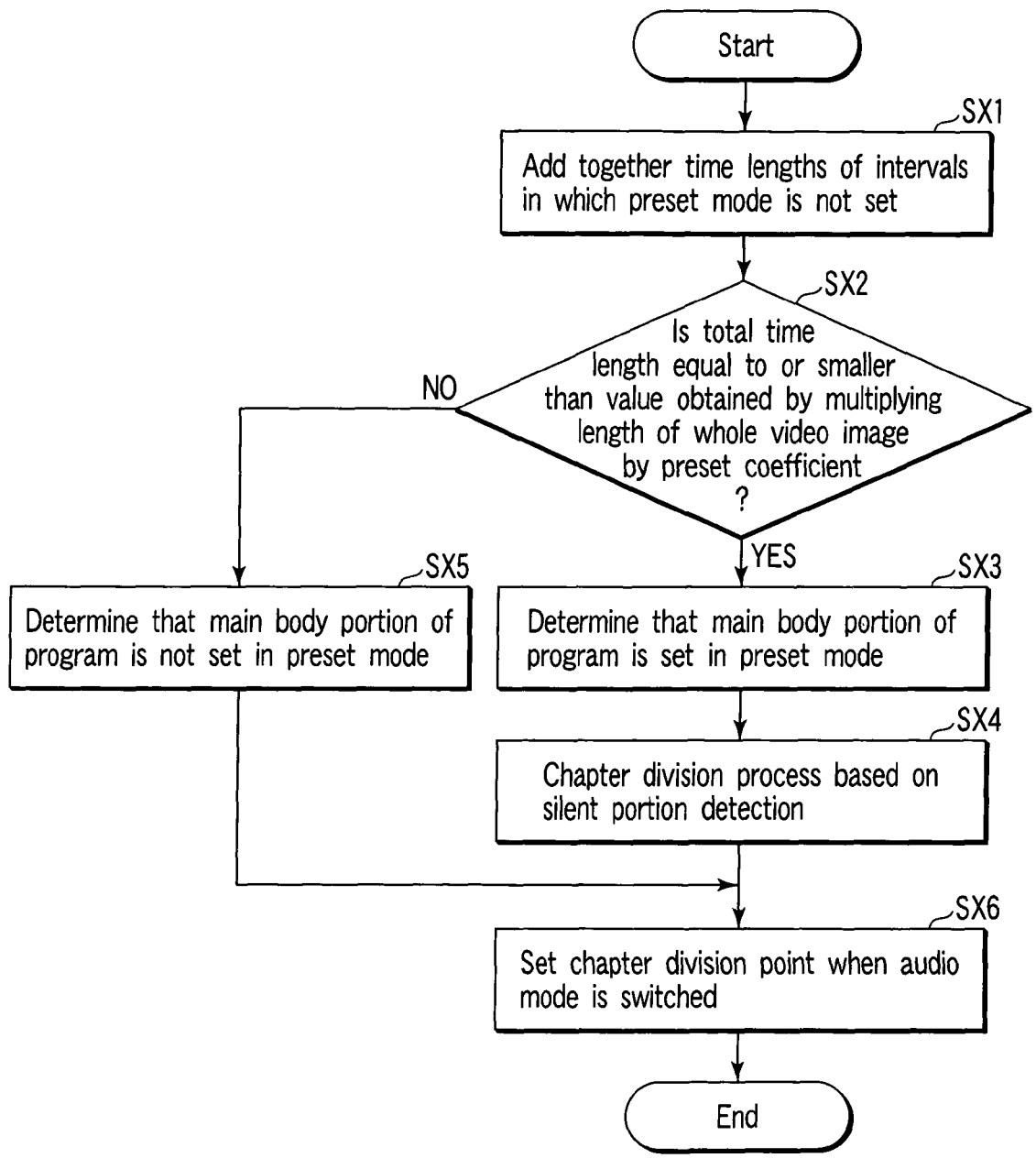
FIG. 19 is an exemplary flowchart for illustrating an example of an operation when the chapter dividing process is performed according to the audio mode in an apparatus of the embodiment.

FIG. 19 is a flowchart for illustrating an operation of a representative one of the above embodiments. The time lengths of intervals of a program in which a preset mode (stereo mode) is not set are added (step SX1). Next, whether or not the total time length is smaller than a value obtained by multiplying the length of the whole recorded video image by a preset coefficient is determined (step SX2). If the total time length is equal to or smaller than the value obtained by multiplication of the preset coefficient, it is determined that the main body portion of the program is set in a preset mode (stereo mode) (step SX3). Next, a process of setting a chapter division point based on the condition determination is performed by detecting silent portions.

However, when it is determined in the step SX2 that the total time length is larger than the value obtained by multiplication of the preset coefficient, it is determined that the main body portion of the program is not set in the preset mode (stereo mode) but set in the other mode (monaural mode or sound multiplex mode) (step SX5).

After the steps SX4 and SX5, a chapter division point (separation information) is set at a point at which the audio modes are switched (step SX6).

After this, information of the chapter division point (separation information) is recorded as part of management information on a recording medium, for example. For example, it is described as an entry point in the management information.

Further, attribute information may be attached to the entry point (separation information). As described before, the attribute information is used to distinguish the separation information items x1, x2, x3, x4, x5, x6 set by detecting the silent portions from the separation information items x7, x8 set by referring to the audio mode.

Figure 20:
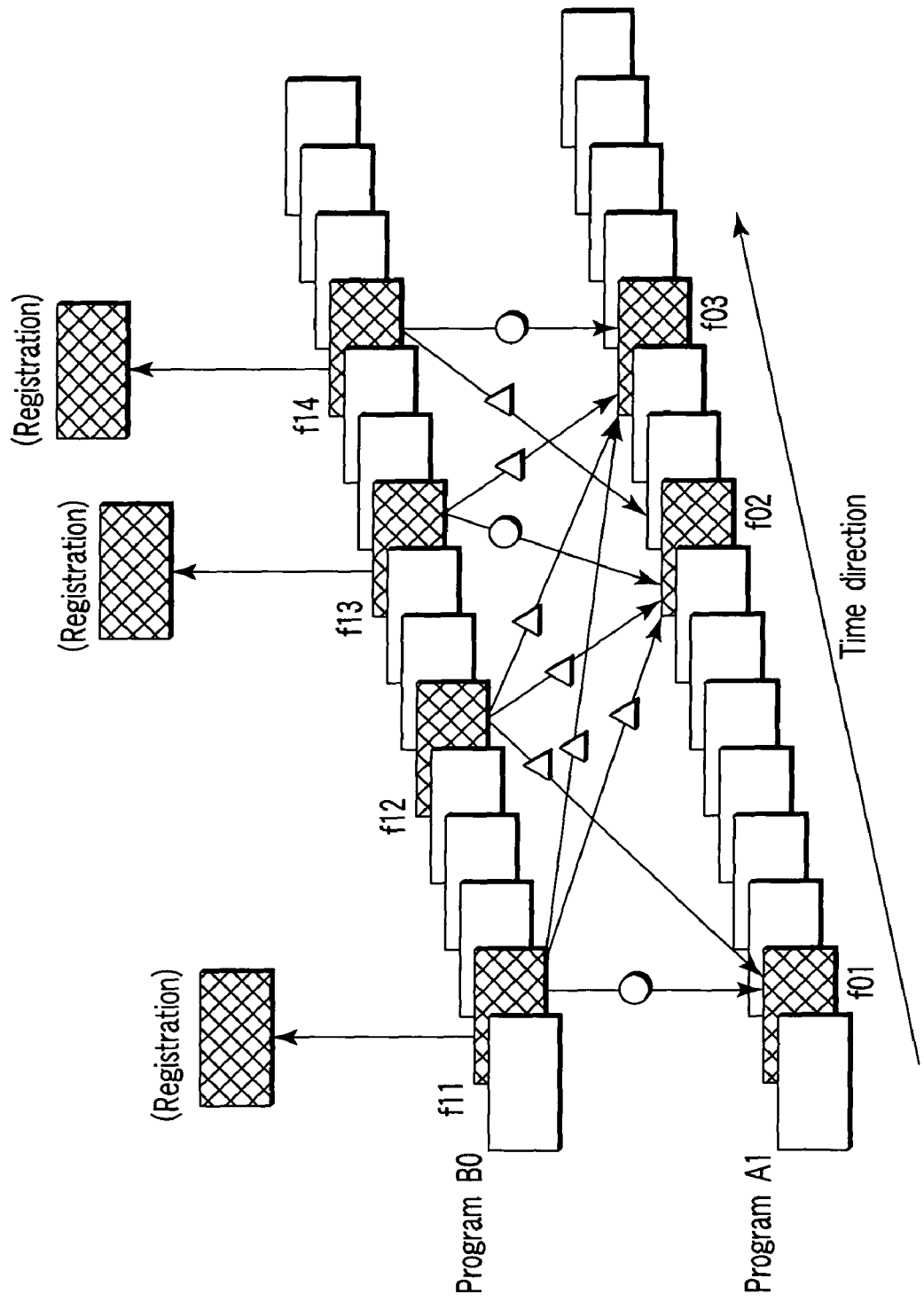
FIG. 20 is an exemplary diagram for illustrating an example of an algorithm when a scene change is detected in the apparatus of the embodiment.

FIGS. 20, 21, 22 simply show examples of the application algorithms A1, B1, C1 shown in FIG. 6. In FIG. 20, a method of detecting a scene change portion in the video signal and setting an interval in which the image contents have a relation is shown. For example, it is assumed that a program B0 is provided as a program similar to the program A1. For example, like a news program, the program is broadcasted in the same time period every morning or every night. If the above program A1, B0 is provided, commercials of the same sponsor are broadcasted in some cases and the same opening video images and ending video images are used in many cases. Therefore, if similar images for the programs can be confirmed, the similar image detection position can be utilized as the chapter division position.

It is now assumed that the program A1 is already recorded on a recording medium as a reference program. Further, it is assumed that the frame of the scene change position of the program A1 is detected and the frame number and time (the relative frame number and time in the program) are registered. At this time, the program B0 is now under recording or has been just recorded.

In FIG. 20, hatched frames are detected frames (scene change frames) in which scene changes occur. The scene change frame of the program A1 is compared with the scene change frame of the program B0. The scene change can be detected on a real time basis by comparing the frames before and after the present frame even when it is now being recorded. In this case, the contents of the frame f11 of the program B0 are compared with those of a scene change frame in substantially the same time period (approximately several minutes before and after the present frame) in the program A1. Thus, the degree of similarity of the two frames is determined. In FIG. 20, a state in which the scene change frames f11, f12, f13, f14 of the program B0 are compared with scene change frames f01, f02, f03 of the program A1 is shown. The degree of similarity of the frames to which circular marks are attached is high and the frames to which triangular marks are attached are non-similar. In this example, the frames f11, f01 are set in the similar relation, the frames f13, f02 are set in the similar relation, and the frames f14, f03 are set in the similar relation. It is indicated that a frame similar to the frame f12 is not present. Therefore, when the scene change frame of the program B0 is registered, the frames f11, f13, f14 are registered. On the next day, the program B0 may be utilized as the reference program. Further, both of the programs A1 and B0 may be utilized as the reference program. As the algorithm A1, the technique disclosed in Jpn. Pat. Appln. KOKAI Publication No. H11-259061 can be used as it is.

In the example described above, the scene change frames of the different programs A1, B0 are detected and similar frames between the programs A1 and B0 are detected. However, in the same program, for example, the program is divided for every 30 minutes and similar scene change frames (or I pictures used as a reference of image compression) may be detected between the video image of the front half portion of 30 minutes and the video image of the later half portion of 30 minutes.

FIG. 21 is an explanatory diagram showing an example of the algorithm B1 shown in FIG. 6. In this example, a variation in the image dynamic vector is monitored between the front and rear frames to detect a frame when the image dynamic vector exceeds a preset threshold value. That is, the detected frame is an index frame and the frame position is used as a separation point. As the algorithm B1, the technique disclosed in Jpn. Pat. Appln. KOKAI Publication No. H9-93588 can be used as it is.

FIG. 22 shows the technique which corresponds to the algorithm C1 of FIG. 6 and utilizes both of the results of analysis of the audio signal and video signal. For the video signal, scene change frames (hatched frames in FIG. 22) are detected. For the audio signal, silent portions are detected. A time point at which the scene change frame and the silent portion coincide with each other is set as a separation point of the composite signal. As the algorithm C1, the technique disclosed in Jpn. Pat. Appln. KOKAI Publication No. H9-214879 can be used as it is.

Figure 24:
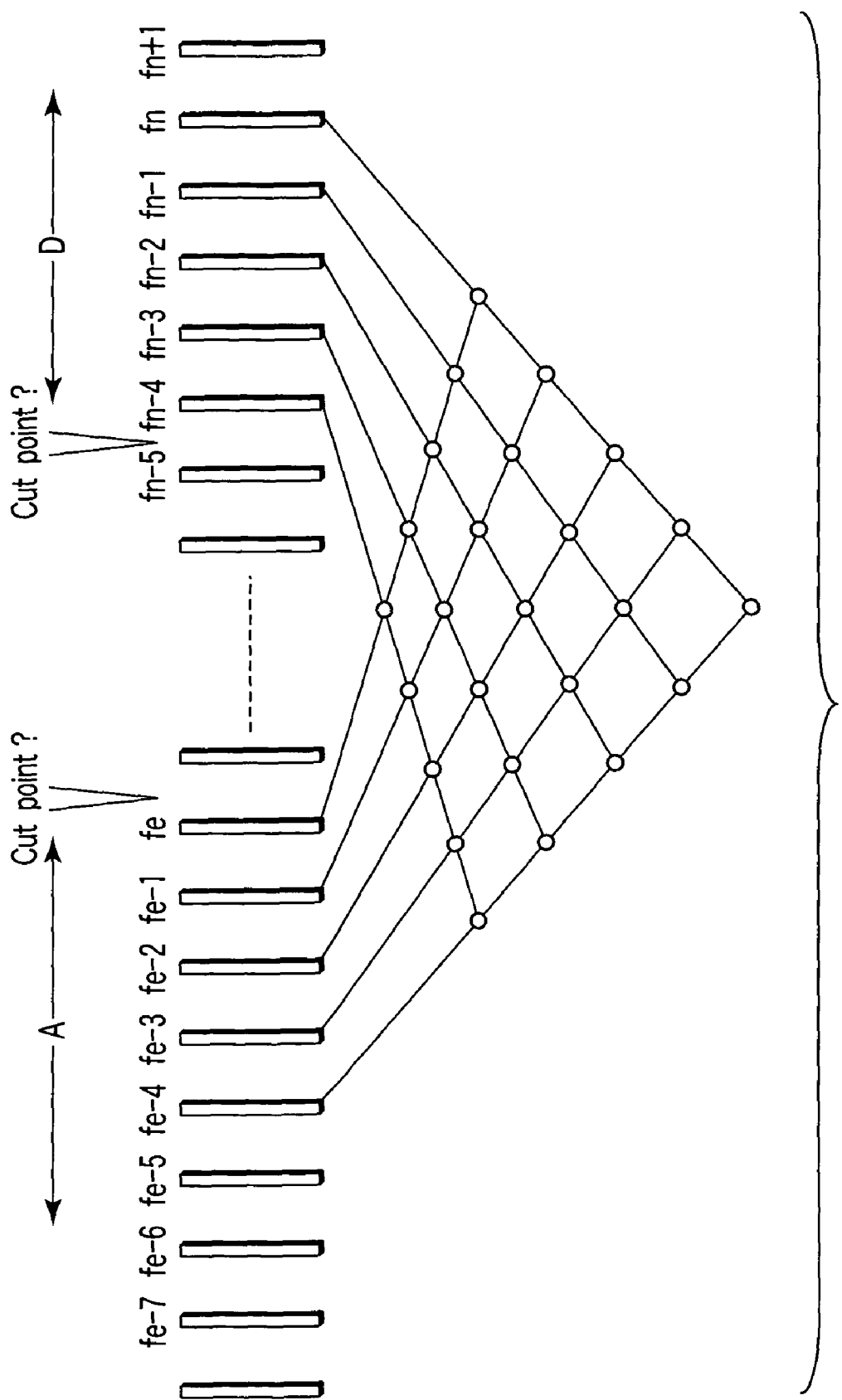
FIG. 24 is an exemplary diagram for illustrating an example of an algorithm when a similar shot is detected by use of a scene change or cut point in the apparatus of the embodiment.

FIGS. 23, 24 illustrate an operation of switching parameters at the time of detection of division points according to a genre code as shown in FIG. 7 when division points are detected.

The function of acquiring the division points is also called a function of subjecting a video signal to structure analysis chapter division (which is also called magic chapter division). The function mainly analyzes video data and determines the degree of similarity of fields or frame images. The function is a method for making cut detection, determination of similar shots and calculation of the number of dialogs to determine a chapter boundary. In this case, a portion between the cut points is referred to as a shot.

The "cut detection" compares an I picture frame and another I picture frame (or frames for every 0.5 second) and determine that the frames are not similar to each other when the hue of the whole screen is largely different or the number of areas in which a variation in the luminance is large is larger than that of preset parameters. The method sequentially compares the frames which are separated from one another by 0.5 second and sets cut points in desired portions of a period if the period is provided in which the number of sets of non-similar frames is larger than a threshold value. In FIG. 23, a state in which the similarity between frames indicated by arrows is determined is shown. Further, a state in which a cut point is set in a portion where a large number of sets of non-similar frames are provided is shown. In this case, fn, fn–1, fn–2, . . . , fe, fe–1, fe–2, . . . indicate frames.

The "similar shot detection" method determines the degree of similarity between each of several frames traced back from a certain past cut point and each of several frames following after the closest cut point. Then, if the number of sets of frames which are determined to be "similar" is equal to or larger than a threshold value, the shots of both of the frames are determined to be similar. That is, as shown in FIG. 24, whether or not frames between the shots A and D lying between the cut points are similar is determined. In the example of the combination of the frames shown in the drawing, the results of similarity determination equal in number to portions indicated by circular marks, for example, is obtained.

As explained in FIG. 7, the number of frames to be compared or checked can be switched according to a genre. Alternatively, the interval between frames to be compared can be changed according to a genre. As the type of scene change, a type in which a scene is instantaneously changed and a type (resolve) in which a scene is gradually changed according to fade-in or fade-out are provided. Further, a type which is called a wipe is provided. The resolve is often used depending on a program or genre (for example, a variety program). In such a case, it is preferable to increase the number of sets of frames or the frame interval shown in FIGS. 23, 24 in order to detect a scene change. Then, it is determined that a scene change occurs when a difference between the frames exceeds a preset threshold value. Alternatively, it is determined that a scene change occurs when the number of sets in which a difference between the frames exceeds a threshold value becomes larger than a preset number.

Since a difference between frames is large when the scene change instantaneously occurs (it often occurs in a drama), it can be sufficiently detected even when the interval between the frames to be compared as shown in FIGS. 23, 24 is short or the number of sets of the frames to be compared is small.

In the present apparatus, the interval between the frames at the cut point detection time shown in FIG. 23, the number of sets of frames or the number of sets of frames when a similar shot of FIG. 24 is detected is changed according to a genre.

The "dialog detection" and "dialog frequency" are defined as follows. (a) A period (portion) in which similar shots concentratedly appear is a significant period. (b) An index of "dialogue frequency" is introduced in order to numerically express the density with which similar shots appear. The "dialogue frequency" becomes higher as the following conditions are satisfied to a greater extent. (b1) A large number of shots are contained (=cut points frequently appear). (b2) The number of shots which contribute to the dialogue (which are similar) is large. (b3) The total time period of shots which contribute to the dialogue (which are similar) is long.

(c) The dialogue period is calculated based on the dialogue frequency. (d) Dialogue periods which are close to one another are connected.

The "structure analyzing chapter division" function is basically carried out by performing the above process. When cut points are set and similar shots are detected, it will be sufficient to perform the above process in some cases. However, in order to additionally provide a function of restructuring a plurality of program configurations, the following functions may be provided.

That is, a "news program inherent processing" function and "other program processing" function are provided. The "news program inherent processing" function detects a topic head shot and it is assumed that similar shots which are distributed at some rate in the program and appear at a certain frequency or more with a certain length are treated as "head shots of topics". When the "head shots of topics" are successive, it is determined that the last one of the successive shots is a true "topic head shot" and the other shots are "follow-up shots of previous topics". In the "other program processing" function, a "corner title detection" function is set. The function determines similar shots which are widely distributed in the program, and do not belong to the dialogue period and appear at a certain frequency or more as a "corner title". If a corner title does not appear for some time after the program has started, the program is regarded as a "program having no corner title".

As described above, when information of cut points of the program, information of similar shots, information of a head topic of the news program and information of corner titles of other programs are acquired, the thus acquired information can be used as effective information in a case where the program is edited or the chapter of the program is structured.

As described above, when a division point is set according to the broadcasting mode, broadcasting station mode and genre, the frame image immediately before or after the division point is used as an index image.

Figure 25:
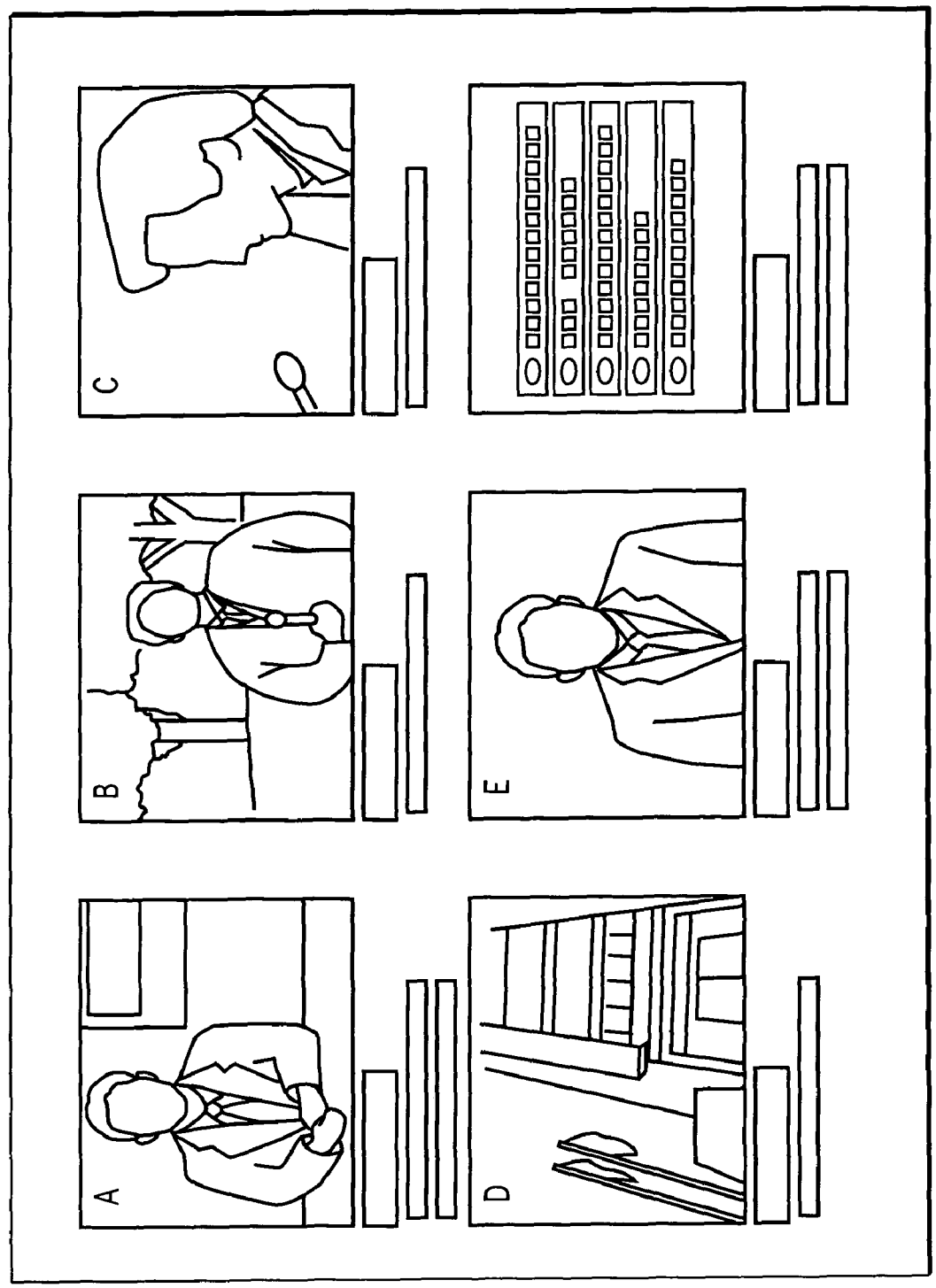
FIG. 25 is an exemplary view showing an example in which index images are displayed in the apparatus of the embodiment.

FIG. 25 shows an example of a screen when the apparatus is set into an index image display mode (chapter display mode) after the index image of the program C1 is registered. When a chapter division point is determined and a frame image corresponding to the chapter division point is determined, a list display of the index images can be attained by subjecting the frame image to a compression process and recording the same as an index image on the recording medium. However, it is not always necessary to independently record the index image on the recording medium. That is, if the chapter division point is registered as an entry pointer in the management information, it is possible to display a list of frame images by compressing corresponding frame images when the index image is requested.

FIG. 26 is a diagram showing the whole configuration of a recording and reproducing apparatus to which this invention is applied. The recording and reproducing apparatus includes two types of disk drive sections. An optical disk 101 is an information recording medium which can be used to structure a video file. A disk drive section 102 rotates and drives the optical disk 101 to read and write information. A hard disk drive (HDD) section 104 drives a hard disk.

A data processor section 103 can supply recording data to the disk drive section 102 and hard disk drive section 104 and receive a reproduced signal. The disk drive section 102 has a rotation control system, laser drive system, optical system and the like for the optical disk 101.

The data processor section 103 deals with data of the recording or reproducing unit and includes a buffer circuit, modulation/demodulation circuit, error correction section and the like.

The recording and reproducing apparatus has an encoder section 200 which configures the recording side, a decoder section 300 which configures the reproducing side, and a microcomputer block 400 which generally controls the operation of the apparatus main body as main constituents. The encoder section 200 includes a video and audio analog-digital converter which converts an input analog video signal or analog audio signal into a digital form, video encoder and audio encoder. Further, it includes a sub video encoder which compresses movie subtitles.

An output of the encoder section 200 is converted into a preset DVD (such as DVD-R, DVD-RW, DVD-RAM) format in a formatter 204 which includes a buffer memory 203 and supplied to the data processor section 103. The encoder section 200 is supplied with an external analog video signal and external analog audio signal from an AV input section 211 or an analog video signal and analog audio signal from a TV tuner 212. The encoder section 200 can directly supply a compressed digital video signal and digital audio signal to the formatter 204 when the compressed digital video signal and digital audio signal are directly input thereto. Further, the encoder section 200 can directly supply a digital video signal and audio signal which are subjected to the analog-digital conversion process to a video mixing section 305 and audio selector 301, respectively.

In the video encoder contained in the encoder section 200, a digital video signal is converted into a digital video signal compressed with a variable bit rate based on an MPEG2 or MPEG1 standard. An audio signal is converted into a digital audio signal compressed with a fixed bit rate based on an MPEG or AC-3 standard or a digital audio signal of linear PCM.

When a sub video signal is input from the AV input section 211 (for example, a signal from a DVD video player with an independent output terminal of a sub video signal) or a DVD video signal with the above data structure is broadcasted and received by the TV tuner 212, a sub video signal of the DVD video signal is encoded (run-length coded) in a sub video encoder and used as a bit map of the sub video signal.

The encoded digital video signal, digital audio signal and sub video data are packed in the formatter 204 to form a video pack, audio pack and sub video pack which are combined and converted into a format defined according to a DVD-recording standard (for example, a standard used for recording on a DVD-RAM, DVD-R, DVD-RW or the like).

The apparatus can supply information (video, audio, sub video data packs and the like) formatted in the formatter 204 and management information formed to the hard disk drive section 104 or data disk drive section 102 via the data processor section 103 and record the same on a hard disk or optical disk 101. Further, information recorded on the hard disk or optical disk can be recorded on the optical disk 101 or hard disk via the data processor section 103 and disk drive section 102.

The edition process of partly removing video objects of a plurality of programs recorded on the hard disk or optical disk 101, connecting objects of different programs and the like can be performed. This is because the edition process can be simplified by defining the data unit which the DVD format deals with and processing the signal in the above data unit.

The microcomputer block 400 includes an MPU (micro processing unit) or CPU (central processing unit), a ROM (not shown) in which a control program and the like are recorded and a RAM which provides a work area required for execution of the program.

The MPU (micro processing unit) of the microcomputer block 400 detects a defective location, detects an unrecorded area, sets a recorded information recording position, records UDF, sets an AV address and the like by using the RAM as a work area according to the control program stored in the ROM.

Further, the microcomputer block 400 includes an information processing section required for controlling the whole portion of the system and additionally includes a work RAM, directory detecting section, VMG (video management information of the whole portion) information forming section, copy-related information detecting section, copy and scrambling information processing section (RDI processing section), packet header processing section, sequence header processing section, aspect ratio information processing section and the like.

The contents to be informed to the user among the results of execution by the MPU are displayed on a display section 402 of the video data recording and reproducing apparatus or OSD-displayed (on-screen displayed) on a monitor display. Further, the microcomputer block 400 includes a key input section 401 which supplies an operation signal used to operate the apparatus. Timings at which the microcomputer block 400 controls the disk drive section 102, hard disk drive section 104, data processor section 103, encoder section 200 and/or decoder section 300 can be determined based on time data from an STC (system time clock) 403.

The recording and reproducing operations are generally performed in synchronism with the time clock from the STC 403, but the other processes may be performed at timings independently from the STC 403.

The decoder section 300 includes a separator which separates and takes out each pack from a signal of the DVD format having the pack structure, a memory used at the execution time of pack separation and other signal processes, a V decoder which decodes main video data (the contents of the video pack) separated by the separator, an SP decoder which decodes sub video data (the contents of the sub video pack) separated by the separator, and an A decoder which decodes audio data (the contents of the audio pack) separated by the separator. Further, it includes a video processor which adequately synthesizes a decoded sub video image with a decoded main video image, superimposes a menu, highlight button, subtitles and other sub video image on the main video image and outputs the same.

An output video signal of the decoder section 300 is input to the video mixing section 305. The video mixing section 305 synthesizes text data. Further, the video mixing section 305 is connected to a line used to directly fetch a signal from the TV tuner 212 and A/V input section 211. In addition, the video mixing section 305 is connected to a frame memory 306 used as a buffer. When an output of the video mixing section 305 is an analog output, it is output to the exterior via an I/F (interface) 307, and when it is a digital output, it is output to the exterior via a digital-analog converter 308.

Further, the video mixing section 305 can output an image signal used to form a guidance screen as a GUI. The image signal is controlled by a guidance screen processing control section 40d in the microcomputer block 400.

Further, an operation input determining section 40a (corresponding to the operation input determining section 11a of FIG. 1), setting-for-recording control section 40b, editing process control section 40c, guidance screen processing control section 40d and the like are provided and the control section 400 can generally control the whole portion of the apparatus.

In the microcomputer block 400, the program attribute determining section 11b for the object program, program guidance information holding section 11c, algorithm and/or parameter holding section 11e and algorithm and/or parameter determining section 11d shown in FIG. 1 are provided. Further, the recording process control section 11g and reproduction control section 11h are provided. The recording process control section 11g records a composite signal in a preset format (for example, DVD format) on a recording medium such as a hard disk specified in the recording mode. At this time, of course, management information used to reproduce the composite signal is formed and recorded on the recording medium. Then, a separation point (chapter division point) from the separation point setting processing section 11f is contained in the management information as entry point information, for example.

An output audio signal of the decoder section 300 is converted into analog signal in the digital-analog converter 302 via the selector 301 and output to the exterior. The selector 301 is controlled by a select signal from the microcomputer block 400. As a result, the selector 301 can directly select a signal which has passed through the encoder section 200 when a digital signal from the TV tuner 212 or A/V input section 211 is directly monitored.

In the formatter 204 of the encoder section 200, each separation information is formed during the recording operation and periodically supplied to the MPU of the microcomputer block 400 (information at the GOP header interruption time). As the separation information, the number of packs of VOBUs (video object units), the end address of the I picture from the head of the VOBU, reproduction time of the VOBU and the like are provided.

At this time, information from the aspect information processing section is supplied to the MPU at the recording start time and the MPU forms VOBU stream information (STI). The STI holds resolution data, aspect data and the like and the initialization process is performed based on the information in each decoder section at the reproduction time.

Further, in this apparatus, one video file is set for each disk. In order to continue the reproduction operation without interruption while the data accessing (seeking) operation is being performed, the minimum continuous information unit (size) is determined. The unit is called a CDA (contiguous data area). The CDA size is an integral multiple of an ECC (error correction code) block (16 sectors) and the recording operation is performed in the CDA unit in the file system.

The data processor section 103 receives data of the VOBU unit from the formatter of the encoder section 200 and supplies data of the CDA unit to the disk drive section 102 or hard disk drive section 104. When the MPU of the microcomputer block 400 forms management information required for reproducing recorded data and recognizes a command of the end of the data recording operation, it supplies the formed management information to the data processor section 103. Thus, the management information is recorded on the disk. Therefore, when the encoding operation is performed, the MPU of the microcomputer block 400 receives information (such as separation information) of the data unit from the encoder section 200. Further, the MPU of the microcomputer block 400 recognizes management information (file system) read out from the optical disk and hard disk at the recording start time, recognizes an unrecorded area of each disk and sets the recording area for data on the disk via the data processor section 103.

According to the above embodiment, since the optimum separation point forming algorithm can be used for each program, the dividing process of chapters or the like with respect to programs of various types of genres can be stably performed.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video image recording and reproducing apparatus which sets chapter division points on video data included in one broadcasting program, comprising:
    a holding section which holds a plurality of analysis algorithms to set the chapter division points;
    an acquiring section which acquires electronic program guidance information containing attribute information relating to the broadcasting program;
    a separation point setting processing section which selectively switches the plurality of analysis algorithms to detect chapter division points in correspondence to the attribute information and detects a plurality of chapter division points on the video data of said one broadcasting program; and
    a recording process control section which adds information on said plurality of chapter division points, as entry point information, to management information.

2. The video image recording and reproducing apparatus according to claim 1, wherein the separation point setting processing section uses all of a broadcasting mode of a program, broadcasting station code and program genre to determine a first algorithm corresponding to the broadcasting mode, a second algorithm corresponding to the broadcasting station code and a third algorithm corresponding to the program genre when the analysis algorithm is determined.

3. A video image recording and reproducing method of a video image recording and reproducing apparatus including a control section which generally controls an operation, a receiving section which receives a broadcasting signal based on the control operation of the control section, and a demodulation and signal processing section which converts a reception signal received by the receiving section into a composite signal by demodulating and processing the reception signal, for storing the composite signal in a recording medium according to an operation input, comprising:

holding a plurality of analysis algorithms to set the chapter division points on video data included in one composite signal;

acquiring electronic program guidance information containing attribute information relating to the broadcasting program;

selectively switching the plurality of analysis algorithms to detect chapter division points in correspondence to the attribute information and detecting a plurality of chapter division points on video data of said one composite signal; and adding information on said plurality of chapter division points, as entry point information, to management information.

4. The video image recording and reproducing method according to claim 3, wherein the attribute information includes all of a broadcasting mode, broadcasting station code and program genre.

5. The video image recording and reproducing method according to claim 3, wherein a determining process of said plurality of chapter division points changes parameters for a frame process according to a genre of program attributes.

6. The video image recording and reproducing method according to claim 3, wherein the plurality of analysis algorithms switch between a detecting process of said plurality of chapter division points by using only information in which a silent portion of an audio signal is detected and a detecting process of said plurality of chapter division points by using information in which a changing point of an audio mode of an audio signal and a silent portion of the audio signal are detected according to a broadcasting mode.

7. The video image recording and reproducing method according to claim 3, wherein the detecting process of said plurality of chapter division points uses a plurality of similar shots contained in the broadcasting program.

8. The video image recording and reproducing method according to claim 3, wherein a signal immediately after the formed chapter division point of the composite signal is displayed on a screen as an index image.

* * * * *